US009105901B2

United States Patent
Sohn

(10) Patent No.: US 9,105,901 B2
(45) Date of Patent: Aug. 11, 2015

(54) BATTERY PACK

(75) Inventor: Kwon Sohn, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 793 days.

(21) Appl. No.: 13/137,914

(22) Filed: Sep. 21, 2011

(65) Prior Publication Data

US 2012/0231314 A1    Sep. 13, 2012

(30) Foreign Application Priority Data

Mar. 8, 2011  (KR) .................. 10-2011-0020446

(51) Int. Cl.
| H01M 10/50 | (2006.01) |
| H01M 6/50 | (2006.01) |
| H01M 2/10 | (2006.01) |
| G05D 23/00 | (2006.01) |
| H01M 10/60 | (2014.01) |
| H01M 10/613 | (2014.01) |
| H01M 10/625 | (2014.01) |
| H01M 10/647 | (2014.01) |
| H01M 10/6551 | (2014.01) |
| H01M 10/6557 | (2014.01) |

(52) U.S. Cl.
CPC ............. *H01M 2/1077* (2013.01); *G05D 23/00* (2013.01); *H01M 6/5038* (2013.01); *H01M 10/50* (2013.01); *H01M 10/5004* (2013.01); *H01M 10/5016* (2013.01); *H01M 10/5032* (2013.01); *H01M 10/5046* (2013.01); *H01M 10/5059* (2013.01); *H01M 2220/20* (2013.01)

(58) Field of Classification Search
USPC ........................................... 429/120
See application file for complete search history.

(56) References Cited

U.S. PATENT DOCUMENTS

| 3,394,756 A | * | 7/1968 | Warner et al. ................. 165/110 |
| 6,010,800 A | * | 1/2000 | Stadnick et al. .............. 429/120 |
| 6,106,972 A | * | 8/2000 | Kokubo et al. ................ 429/120 |
| 8,790,809 B2 | * | 7/2014 | Schaefer et al. .............. 429/120 |
| 2010/0293992 A1 | * | 11/2010 | Fujisawa et al. ................ 62/506 |
| 2011/0117410 A1 | * | 5/2011 | Yoon ............................. 429/120 |
| 2011/0132580 A1 | * | 6/2011 | Herrmann et al. ........ 165/104.33 |

FOREIGN PATENT DOCUMENTS

| JP | 06-054210 U | 7/1994 |
| JP | 11-354166 A | 12/1999 |
| JP | 2009-261125 A | 11/2009 |

(Continued)

OTHER PUBLICATIONS

Machine translation of Oyama (JP 2009-261125, published Nov. 2009, pp. 1-16).*

(Continued)

*Primary Examiner* — Jonathan Crepeau
*Assistant Examiner* — Caitlin Wilmot
(74) *Attorney, Agent, or Firm* — Lee & Morse, P.C.

(57) ABSTRACT

A battery pack includes at least one battery module having a plurality of battery cells that are aligned in the same direction, a heat dissipation member disposed in alignment with the battery module, and a heat conducting member connected to the heat dissipation member. The heat dissipation member has a plurality of heat dissipation fins and a heat dissipation pipe. The heat dissipation pipe is connected with the plurality of heat dissipation fins.

17 Claims, 6 Drawing Sheets

(56) References Cited

FOREIGN PATENT DOCUMENTS

| KR | 10-2006-0101671 A | 9/2006 |
|---|---|---|
| KR | 10-2008-0023401 A | 3/2008 |
| KR | 10-2008-0042965 A | 5/2008 |
| KR | 10-2009-0114964 A | 11/2009 |
| KR | 10-2011-0125804 A | 11/2011 |

OTHER PUBLICATIONS

Korean Notice of Allowance Dated Mar. 22, 2013.
Korean Office action dated Sep. 4, 2012 for KR 10-2011-0020446 (Sohn).

* cited by examiner

BATTERY PACK

BACKGROUND

1. Field

Embodiments relate to a battery pack.

2. Description of the Related Art

In general, secondary batteries are rechargeable and can be repeatedly used. The secondary batteries may be implemented as a battery cell used for portable small-sized electronic devices such as a cellular phone, a desktop computer, a laptop computer, a camera and camcorder. Alternatively, the secondary batteries may be implemented as a battery pack including a plurality of battery cells, used as a power source for driving motors of a high-power hybrid electric vehicle (HEV), an electric vehicle (EV), and the like.

The battery pack used as a power source for driving high-power motors generates a large amount of heat due to a charge or discharge operation, and the generated heat may deteriorate the battery cells.

SUMMARY

Embodiments are directed to a battery pack.

At least one of the above and other features and advantages may be realized by providing a battery pack including: at least one battery modules having a plurality of battery cells aligned in the same direction; a heat dissipation member (disposed in alignment with the battery module) having a plurality of heat dissipation fins and a heat dissipation pipe (the heat dissipation pipe being connected with the plurality of heat dissipation fins), and a heat conducting member connected to the heat dissipation member.

The heat dissipation pipe may be connected to the heat conducting member. The heat dissipation pipe may extend through the plurality of heat dissipation fins.

The battery pack may further include a housing in which the at least one battery module and the heat dissipation member are disposed. The heat conducting member may be disposed outside of the housing. The heat conducting member may be disposed inside of the housing.

The battery pack may further include a coolant. The coolant may be a fluid or a gas.

The battery pack may further include a fastening member connected to the heat conducting member. The fastening member may connect the heat dissipation pipe and the heat conducting member. The fastening member may be made of a heat conductive material. The heat conducting member may include an outer case and a porous plate (having micro-pores) that is disposed inside of the outer case. The porous plate may be made of a sintered metallic material. A channel may extend through the porous plate.

The outer case may include at least one through-hole portion. The through-hole portion may include first and second through-hole portions. The first through-hole portion may be an inlet for directing coolant for cooling the battery cells into the heat conducting member, and the second through-hole portion may be an outlet for discharging the coolant from the heat conducting member.

The battery pack may further include a housing that encases the at least one battery module. The plurality of battery cells in the at least one battery module may be aligned sided-by-side such that each side wall of each of the plurality of battery cells faces a side wall of an adjacent one of the plurality of battery cells. The plurality of battery cells may be aligned such that a positive electrode terminal of each of the plurality of battery cells may be horizontally aligned with a negative electrode terminal of an adjacent one of the plurality of battery cells. The at least one battery module may further include first and second end plates. The plurality of battery cells may extend between the first and second end plates of the battery module. The at least one battery module may include at least one connection member. The first and second end plates may be connected by the at least one connection member.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
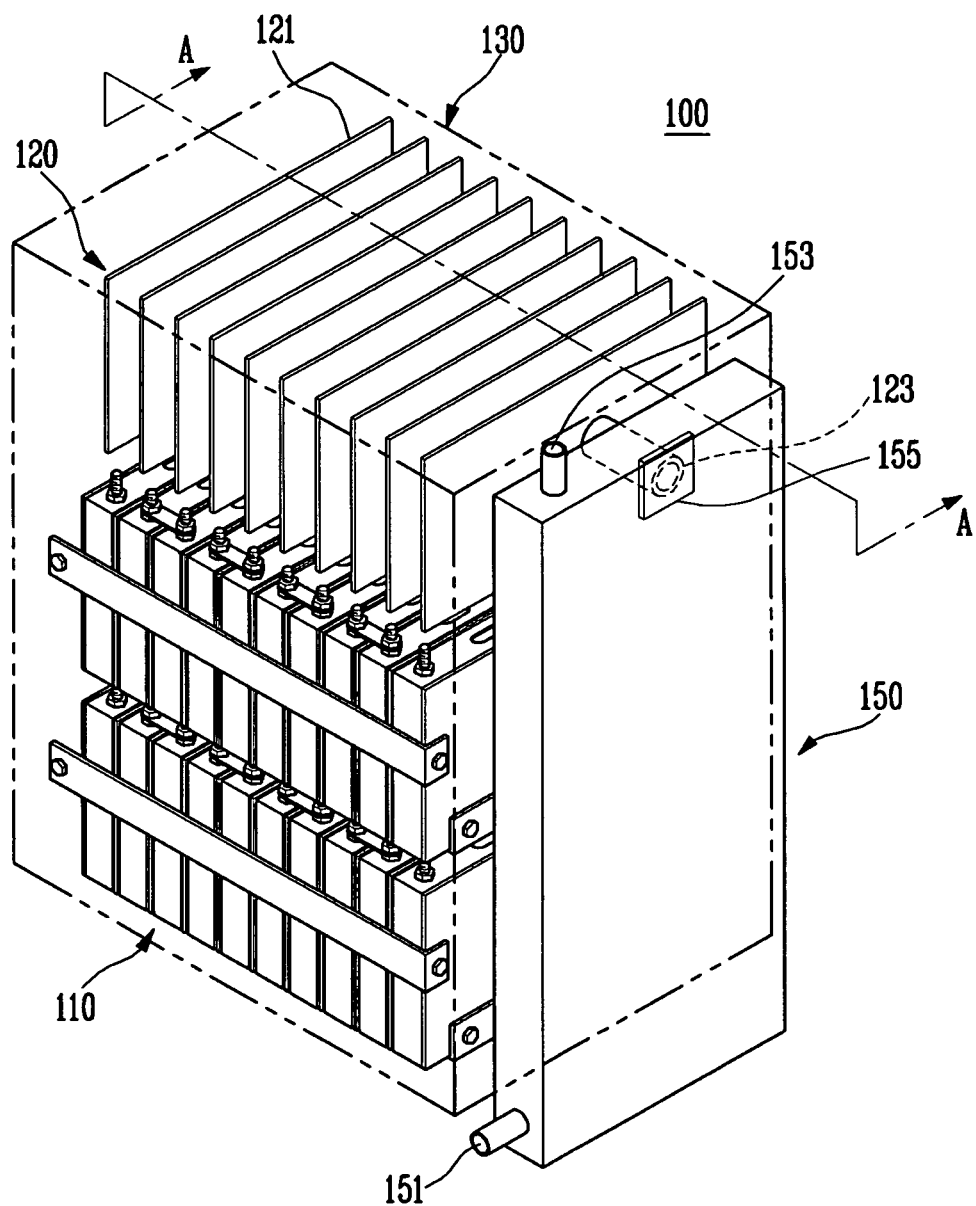
FIG. 1 illustrates a perspective view schematically showing a battery pack according to an embodiment.

Korean Patent Application No. 10-2011-0020446, filed on Mar. 8, 2011, in the Korean Intellectual Property Office, and entitled: "Battery pack" is incorporated by reference herein in its entirety.

It will be understood that when a layer or element is referred to as being "on" another element or substrate, it can be directly on the other element or substrate, or intervening elements may also be present. In the following detailed description, only certain exemplary embodiments have been shown and described, simply by way of illustration. As those skilled in the art would realize, the described embodiments may be modified in various different ways, all without departing from the spirit or scope of the embodiments. Accordingly, the drawings and description are to be regarded as illustrative in nature and not restrictive. In the drawing figures, the dimensions of layers and regions may be exaggerated for clarity of illustration. Also, when an element is referred to as being "connected to" another element, it can be directly connected to the another element or be indirectly connected to the another element with one or more intervening elements interposed therebetween. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Hereinafter, one or more embodiments will be described in detail with reference to the accompanying drawings.

Figure 2:
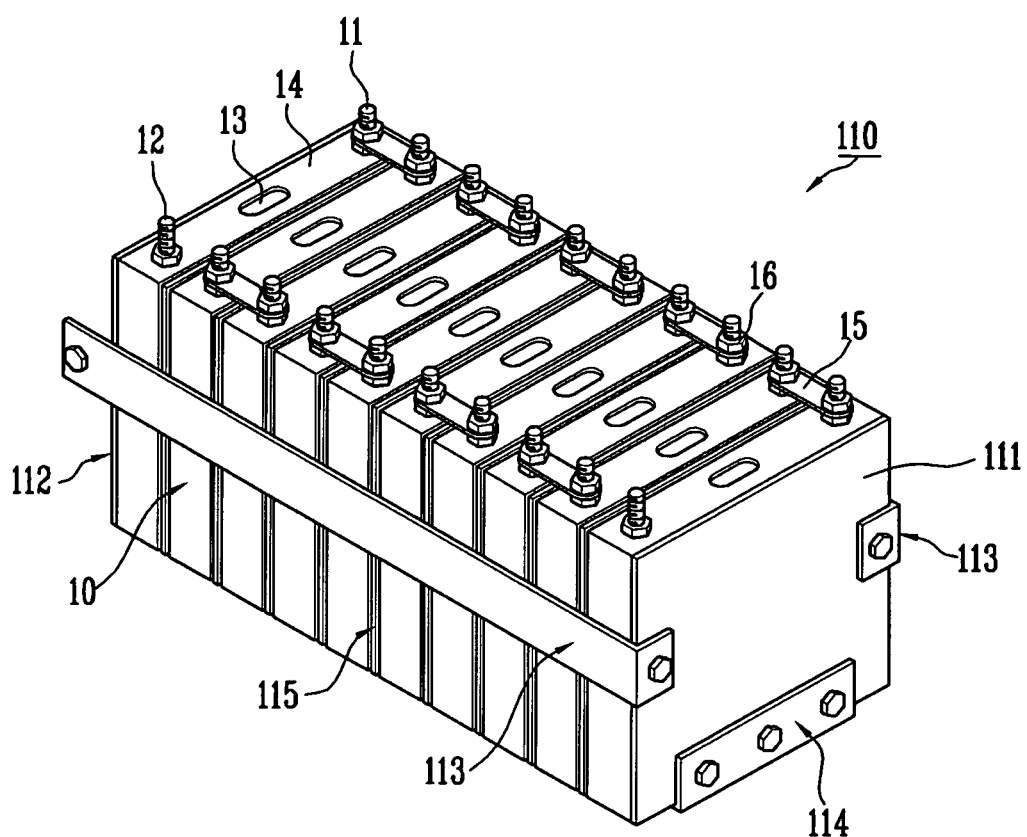
FIG. 2 illustrates a perspective view showing a battery module included in the battery pack of FIG. 1.
Figure 3:
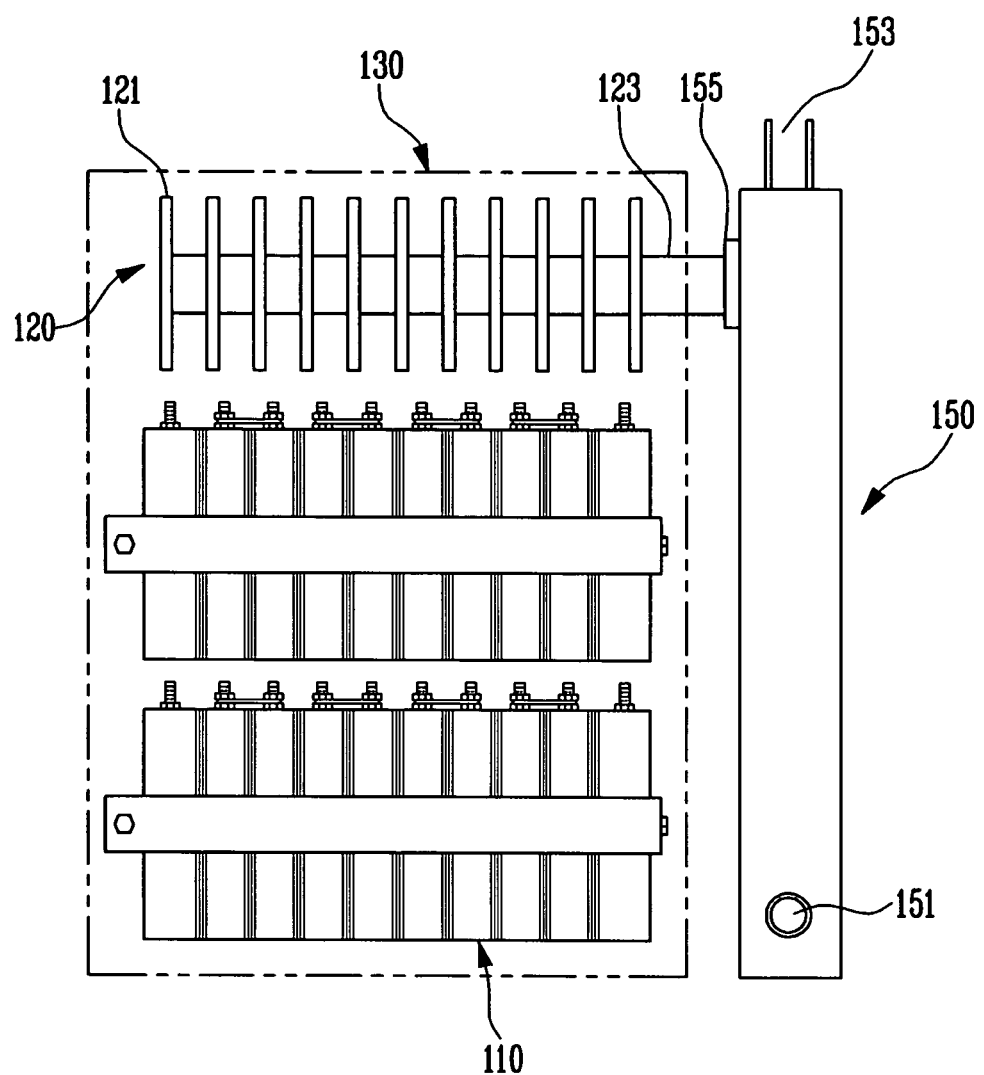
FIG. 3 illustrates a sectional view taken along line A-A of FIG. 1.
Figure 4A:
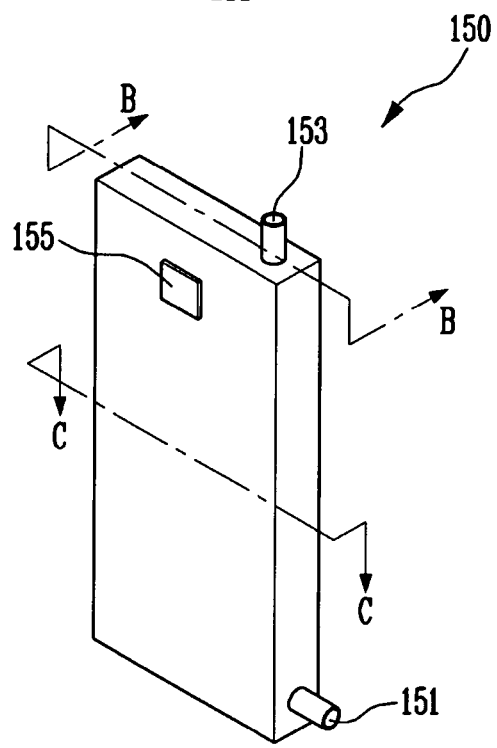
FIG. 4A illustrates a perspective view schematically showing a heat conducting member of the battery pack of FIG. 1.
Figure 4B:
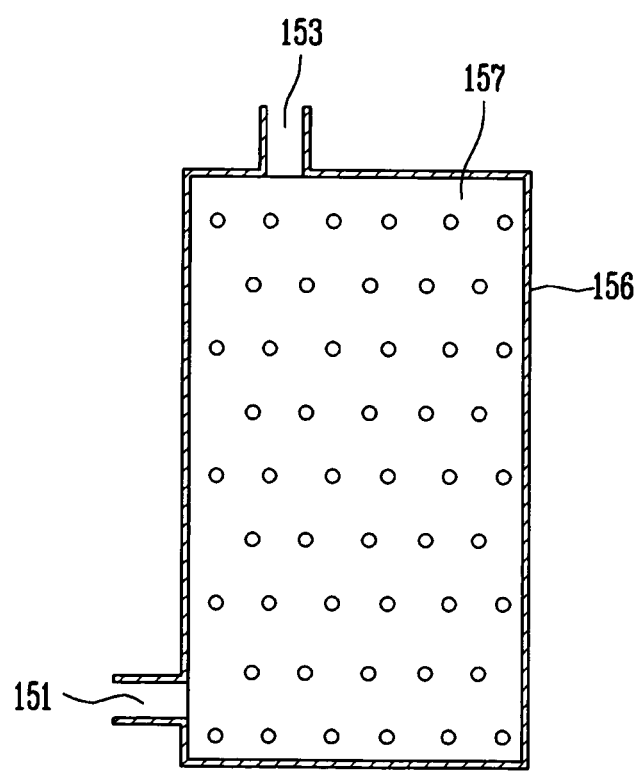
FIG. 4B illustrates a sectional view taken along line B-B of FIG. 4A.
Figure 4C:
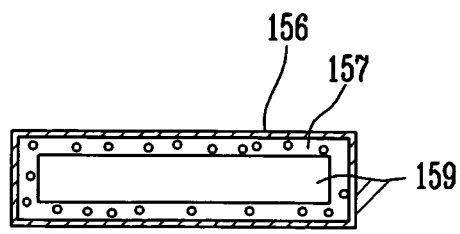
FIG. 4C illustrates a sectional view taken along line C-C of FIG. 4A.

FIG. 1 illustrates a perspective view schematically showing a battery pack according to an embodiment. FIG. 2 illustrates a perspective view showing a battery module included in the battery pack of FIG. 1. FIG. 3 illustrates a sectional view taken along line A-A of FIG. 1. FIG. 4A illustrates a perspective view schematically showing a heat conducting member of the battery pack of FIG. 1. FIG. 4B illustrates a sectional view taken along line B-B of FIG. 4A. FIG. 4C illustrates a sectional view taken along line C-C of FIG. 4A.

The battery pack 100 according to an embodiment may include at least one battery module 110 (having a plurality of battery cells 10 aligned in one direction); a heat dissipation member 120 (having heat dissipation fins 121 provided at a predetermined position in the vicinity of the battery modules 110 and a heat dissipation pipe 123 connected to the heat dissipation fins 121); a housing 130 (that accommodates the battery modules 110 and the heat dissipation member 120); and a heat conducting member 150 (that is provided at a predetermined position exterior of the housing 130 and has a coolant filled in an interior thereof). The heat dissipation fins 121 may be provided, for example, over the battery modules 110. The heat dissipation pipe 123 may, for example, extend through the heat dissipation fins 121. The heat dissipation fins 121 may be disposed in alignment with, e.g. vertical alignment with, the battery modules 110.

Referring to FIGS. 1 and 2, the housing 130 may accommodate one or more battery modules 110. The one or more battery modules 110 may be aligned so that side surfaces of adjacent battery cells 10 are opposite to each other. For example, side walls of adjacent battery cells 10 may face each other. According to an embodiment, the battery cells 10 may be disposed side-by-side. According to an embodiment, each of the battery cells may include opposing first and second side walls and a peripheral wall that extends between and connects the first and second side walls. The first and second side walls may have a width that is greater than the width of the peripheral wall. The first and second side walls of each of the battery cells 10 may be parallel to the first and second side walls of an adjacent battery cell.

The battery module 110 accommodated or disposed in the housing 130 will be described with reference to FIG. 2. The battery module 110 may include a plurality of battery cells 10 aligned in one direction. Each of the battery cells may be provided with positive and negative electrode terminals 11 and 12, at opposing ends of the battery cells. The battery cells 10 may be aligned so that wide surfaces of adjacent battery cells 10 are opposite to each other. For example, the first and second side walls of each of the battery cells 10 may face the first or second side wall of an adjacent battery cell. According to an embodiment, a positive electrode terminal 11 of each of the battery cells may be aligned with a negative electrode terminal of an adjacent battery cell of the battery cells 10.

Each of the battery cells 10 that constitute the battery module 110 may be manufactured by accommodating or disposing an electrode assembly and an electrolyte in a battery case and then sealing the battery case in which the electrode assembly is accommodated using a cap plate 14. According to an embodiment, the electrode assembly may include a positive electrode plate, a negative electrode plate and a separator interposed between the electrode plates. The cap plate 14 may be configured to permit the positive electrode terminal 11 (that is connected to the positive electrode plate) and the negative electrode terminal 12 (that is connected to the negative electrode plate) to extend through the cap plate 14 and protrude to the exterior thereof. Here, the positive and negative electrode plates may generate electrochemical energy through a reaction between the electrolyte and the positive and negative electrode plates; and the generated energy may be transferred to an exterior of the battery cell 10 through the positive and negative electrode terminals 11 and 12. A vent 13 may be provided between the positive and negative electrode terminals 11 and 12 to serve as a path through which a gas may be exhausted or directed to the exterior of the battery cell 10.

In one embodiment, the battery cell 10 may be a prismatic lithium ion secondary battery. However the embodiments are not limited thereto, and may be applied to various types of batteries, such as a lithium polymer battery and a cylindrical battery.

The battery module 110 may include a plurality of battery cells 10, a pair of first and second end plates 111 and 112 (spatially spaced apart from each other) and connection members 113 and 114 (that connect the first and second end plates 111 and 112 to each other).

The first and second end plates 111 and 112 may have surface contact with outermost battery cells 10 of the battery module 110, respectively, so as to apply pressure toward insides of the plurality of battery cells 10. The connection members 113 and 114 may connect the first and second end plates 111 and 112 to each other. One end of the connection members 113 and 114 may be coupled with the first end plate 111; and an opposing end of the connection members 113 and 114 may be coupled with the second end plate 112. In an implementation, the first and second end plates 111 and 112 may be coupled with the connection members 113 and 114 by fastening members, e.g., bolts and nuts.

The connection members 113 and 114 may provide a space in which the plurality of battery cells 10 may be aligned by connecting the first and second end plates 111 and 112 to each other, and may simultaneously support both side surfaces and a bottom surface of each of the battery cells 10. Referring to FIG. 2, it has been illustrated in this embodiment that the connection members 113 and 114 may be provided with two side connection members 113 (that respectively support both the side surfaces of the battery cell 10) and one bottom connection member 114 (that supports the bottom surface of the battery cell 10). However, the positions and shapes of the connection members 113 and 114 may be variously modified according to the design of the battery module 110. In an implementation, the connection member 113 may contact a side surface of the peripheral wall of each of the battery cells 10. According to an embodiment, the connection member 114 may contact a bottom surface of the peripheral wall of each of the battery cells 10.

The battery cells 10 may be fixed in the space (defined by the first and second end plates 111 and 112, the side connection members 113 and the bottom connection member 114) so as not to be easily moved by an external impact. For example, the first and second end plates 111 and 112, the side connection members 113, and the bottom connection member 114, may together provide a frame in which the battery cells 10 are supported. According to an embodiment, the positive and negative electrode terminals 11 and 12 of two adjacent battery cells 10 may be electrically connected to each other through a bus-bar 15. The bus-bar 15 may be provided with holes through which at least a portion of the respective positive and negative electrode terminals 11 and 12 pass or extend. The bus-bar 15 may be coupled with the positive electrode terminal 11 and the negative electrode terminal 12, e.g., the terminals may be connected by passing through the holes and may be fixed by members, such as nuts 16.

A barrier 115 may be interposed between adjacent battery cells 10. A spacer (not shown) may be provided to the barrier 115. The barrier 115 may facilitate spacing apart of the battery cells 10 from each other and may form a space or gap between the battery cells 10, thereby providing a flow path for the coolant that cools the battery cells 10. The barrier 115 may, for example, prevent the battery cells from contacting one another.

The battery cells 10 may generate heat while charging and discharging the battery cells 10 a plurality of times. The generated heat may increase the temperature of the battery cells 10. Thus, the performance of the battery cells 10 may be deteriorated, and safety issues may arise. Accordingly, the heat dissipation member 120 may be disposed on or over the battery modules 110. The heat dissipation member 120 may be provided with heat dissipation fins 121; and a heat dissipation pipe 123 may be connected to the heat dissipation fins 121.

The one or more battery modules 110 and the heat dissipation member 120 may be accommodated or retained in the interior of the housing 130. In an implementation, the heat dissipation member 120 may be disposed on or over the positive and negative electrode terminals 11 and 12 of the battery cells 10 in the battery module 10 and may be positioned in an uppermost portion of the housing 130. However, the position of the heat dissipation member 120 is not limited to that specifically described herein. The coolant (which may be a fluid or gas for cooling the battery cells 10) may be provided to the battery pack 100 including the battery modules 110. In an implementation, the heat dissipation fins 121 may absorb heat generated from the battery cells 10 in the battery module 110 by the medium of the coolant and discharge the heat through the heat dissipation pipe 123. For example, the coolant may transfer heat generated from the battery cells 10 to the heat dissipation fins 121. After the heat dissipation fins 121 absorb the heat transferred by the coolant, heat may be discharged through the heat dissipation pipe 123. In an implementation, the heat conducting member 150 may be open to the housing 130, to allow coolant to flow between the heat conducting member 150 and the housing 130.

Referring to FIG. 3, the heat conducting member 150 may be connected to the heat dissipation member 120. The heat conducting member 150 may be provided outside of the housing 130. The heat conducting member 150 may discharge heat to the exterior of the battery pack 100 through a fastening member 155, which will be further described below. As described, heat may be generated from the battery cells 10 and may be discharged through the heat dissipation fins 121 and the heat dissipation pipe 123. The heat dissipation fins 121, the heat dissipation pipe 123, and the fastening member 155 may all be made of a heat conductive material.

The heat conducting member 150 will be described with reference to FIGS. 4A to 4C. The heat conducting member 150 may include an outer case 156 and a porous plate 157 accommodated in an interior of the outer case 156. The outer case 156 and the porous plate 157 (which constitute the heat conducting member 150) may also be made of a heat conductive material.

In an implementation, the heat conducting member 150 may have a structure in which a channel or void 159 is further provided in an interior of or within the porous plate 157. The void 159 may extend lengthwise through the porous plate 150, as shown in FIG. 4C. In a case where the void 159 is provided in the interior of or within the porous plate 157, as described above, the coolant may circulate in the interior of or within the porous plate 157 more easily by passing through the void 159. Thus, the cooling efficiency of the battery packs 100 may be further improved. For example, the void 159 may facilitate circulation of the coolant through the porous plate 157.

The porous plate 157 may be formed of a metallic material having micro-pores formed therein, but the material of the porous plate 157 is not limited to the materials specifically described herein. For example, the porous plate 157 may be formed of a sintered metallic material obtained by compressing a mixture of metal and binder and then sintering the mixture at a melting point (or higher) of the binder. In the sintered metallic material, micro-pores may be formed at positions corresponding to the position of the original binder.

The fastening member 155 may be provided at one side of the heat conducting member 150. The heat conducting member 150 and the heat dissipation pipe 123 of the heat dissipation member 120 may be coupled with each other by the fastening member 155. In an implementation, the fastening member 155 may be made of a heat conductive material so that the heat discharged from the battery cells 10, the coolant, the heat dissipation fins 121, and the heat dissipation pipe 123 is conducted to the heat conducting member 150 and easily discharged to the exterior of the battery pack 100.

The heat conducting member 150 may be provided with first and second through-hole portions 151 and 153. For example, the first through-hole portion 151 may be an inlet (through which the coolant for cooling the battery cells 10 may flow into the heat conducting member 150); and the second through-hole portion 152 may be an outlet (through which the coolant introduced through the first through-hole portion 151 is discharged from the heat conducting member 150). The coolant may flow into the heat conducting member 150 through the first through-hole portion 151 and may cool the battery modules 110 while circulating in the interior of the housing 130. Then, the coolant may be discharged from the heat conducting member 150 through the second through-hole portion 153.

The first through-hole portion 151 may be a portion or inlet through which the coolant may be introduced into the heat conducting member 150. A temperature of the coolant flowed in the battery pack 100 may be lowest at the first through-hole portion 151. The second through-hole portion 153 may be a portion or an outlet through which the coolant may be discharged from the heat conducting member 150. The temperature of the coolant may be increased or higher when the coolant reaches the second through-hole portion 153 (because of heat exchange with the battery pack 100).

As described above, the barriers 115 may be provided between the respective battery cells 10, may be aligned in one direction, and the spaces or gaps formed by the barriers 115 may form a flow path of the coolant. The coolant may be introduced into a space or gap between the barrier 115 and the battery cells 10 and may exchange heat with the battery cell 10 while coming in contact with a wide surface of the battery cell 10. Then, the coolant may be discharged in a direction different from that in which the coolant is introduced or in which the coolant enters the heat conducting member 150.

Hereinafter, a battery pack according to another embodiment will be described with reference to FIGS. 5 and 6.

Figure 5:
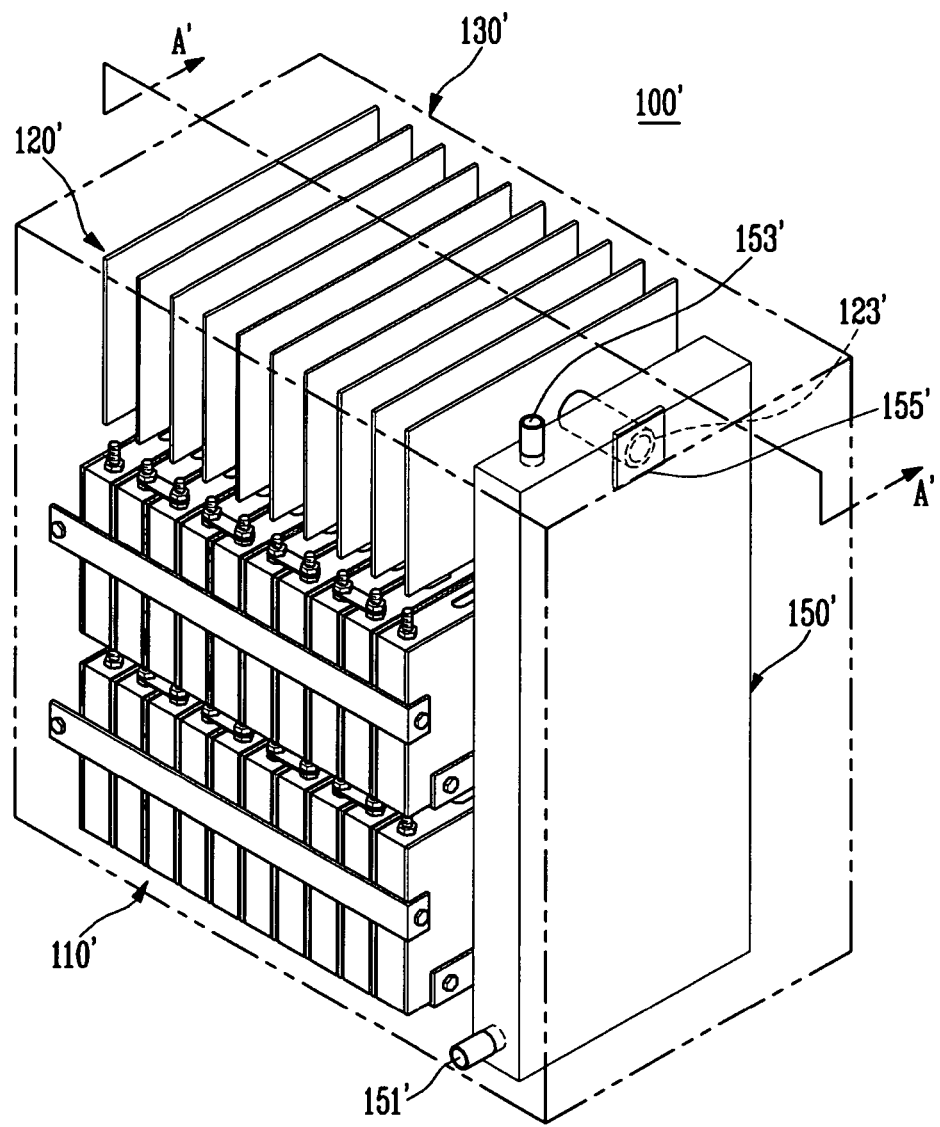
FIG. 5 illustrates a perspective view schematically showing a battery pack according to another embodiment.

FIG. 5 illustrates a perspective view schematically showing a battery pack 100' according to another embodiment. FIG. 6 illustrates a sectional view of the battery pack 100' taken along line A-A' of FIG. 5.

The battery pack 100', according to the present embodiment, is different from that of the aforementioned embodiment of the battery pack 100 with respect to the position at which a heat conducting member 150' is disposed. Hereinafter, differences from the aforementioned embodiment will be described, and repeated, overlapping descriptions will be omitted.

Figure 6:
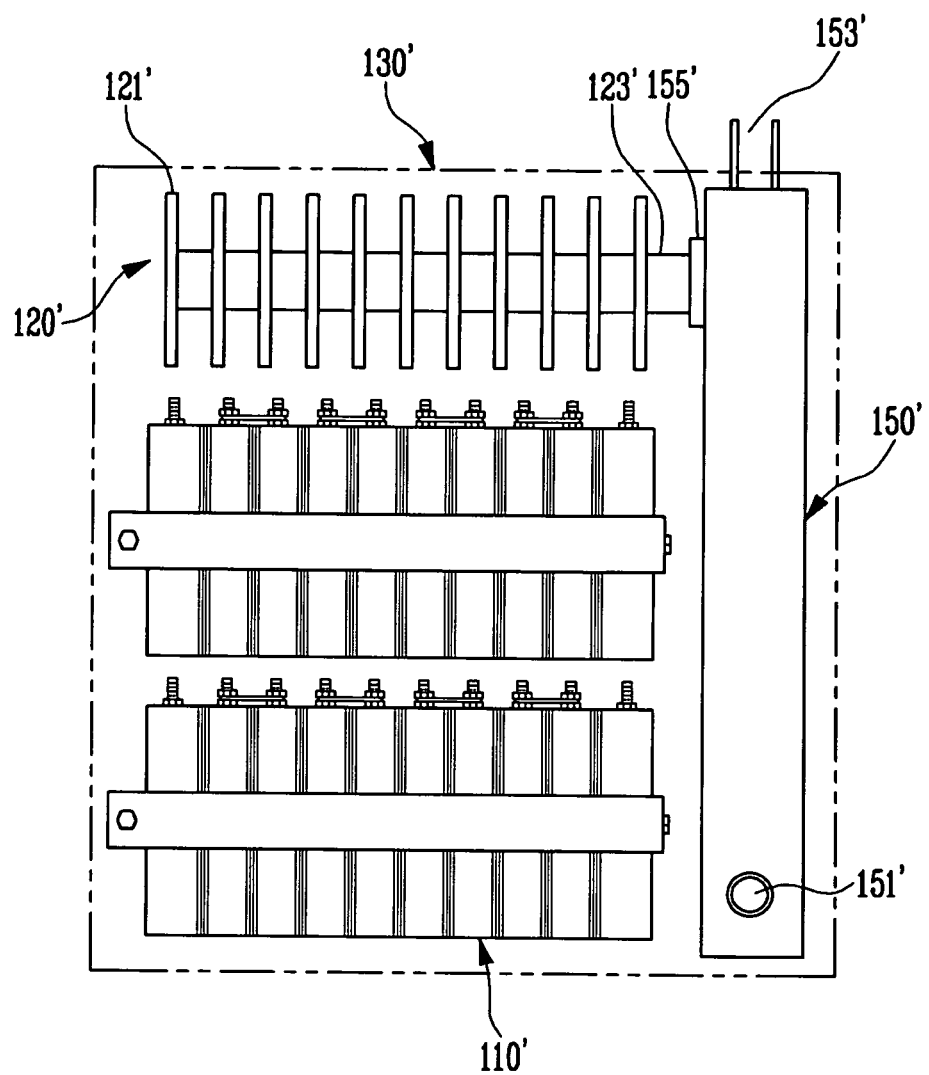
FIG. 6 illustrates a sectional view taken along line A-A' of FIG. 5.

Referring to FIGS. 5 and 6, the battery pack 100' may include battery modules 110' (each having a plurality of battery cells 10' aligned in one direction); a heat dissipation member 120' (having heat dissipation fins 121' provided at a predetermined position in a vicinity of the battery modules 110'), a heat dissipation pipe 123' (coupled with the heat dissipation fins 121'); a housing 130' (that accommodates or houses the battery modules 110' and the heat dissipation member 120'); and a heat conducting member 150 (at a predetermined position in the interior of the housing 130' and that has a coolant in an interior thereof or disposed therein).

The battery module 110' accommodated in the housing 130' may be identical to the battery module 110 according to the aforementioned embodiment, and therefore, overlapping descriptions will be omitted.

In the battery pack 100, according to the previous embodiment, the heat conducting member 150 connected to the heat dissipation member 120 may be disposed at outside of the housing 130. However, in the battery pack 100' according to the present embodiment, the heat conducting member 150' may be disposed inside of the housing 130'. Here, heat that is generated from the battery cells 10' and absorbed through the heat dissipation member 120' (having the heat dissipation fins 121' and the heat dissipation pipe 123') may be conducted to the heat conducting member 150' through a fastening member 155', and then discharged to the exterior of the housing 130' of the battery pack 100'.

Like the aforementioned embodiment, the coolant, such as a fluid or gas for cooling the battery cells 10', may be provided to the battery pack 100' including the battery modules 110'. Unlike the aforementioned embodiment, the battery pack 100' according to the present embodiment may be provided with the housing 130' having the heat conducting member 150' integrally formed in an interior thereof. Thus, it is possible to implement or manufacture the battery pack 100' that is small and integrated. In other words, the battery pack 100' may be compact and formed as one piece.

Except for the position of the heat conductive member 150', as described above, the heat conducting member 150' according to the present embodiment is identical to the heat conducting member 150 according to the aforementioned embodiment, shown in FIGS. 4A to 4C, and therefore, its description will be omitted.

The battery pack according to one or more embodiments may include heat dissipation fins, a heat dissipation pipe, and a porous heat conducting member, so that it may be possible to improve heat dissipation characteristics using a coolant.

Accordingly, it is possible to provide a battery pack having improved cooling efficiency, in which a battery cell may not easily deteriorate even though it is charged and discharged a plurality of times.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   at least one battery module having a plurality of battery cells, the plurality of battery cells being aligned in the same direction;
   a heat dissipation member disposed in alignment with the battery module, the heat dissipation member having a plurality of heat dissipation fins and a heat dissipation pipe, the heat dissipation pipe being connected with the plurality of heat dissipation fins;
   a heat conducting member connected to the heat dissipation member, wherein the plurality of heat dissipation fins are located over the at least one battery module in spaced relation thereto and neither the heat dissipation member nor the heat conducting member is connected to the at least one battery module or the battery cells; and
   a fastening member connected to the heat conducting member, the fastening member connecting the heat dissipation pipe and the heat conducting member.

2. The battery pack as claimed in claim 1, wherein the heat dissipation pipe extends through the plurality of heat dissipation fins.

3. The battery pack as claimed in claim 1, further comprising a housing in which the at least one battery module and the heat dissipation member are disposed.

4. The battery pack as claimed in claim 3, wherein the heat conducting member is disposed outside of the housing.

5. The battery pack as claimed in claim 3, wherein the heat conducting member is disposed inside of the housing.

6. The battery pack as claimed in claim 3, further comprising a coolant in the heat conducting member and the housing.

7. The battery pack as claimed in claim 6, wherein the coolant is a fluid.

8. The battery pack as claimed in claim 1, wherein the fastening member is made of a heat conductive material.

9. The battery pack as claimed in claim 1, wherein the heat conducting member includes an outer case and a porous plate having micro-pores, the porous plate being disposed inside of the outer case.

10. The battery pack as claimed in claim 9, wherein the porous plate is made of a sintered metallic material.

11. The battery pack as claimed in claim 9, further comprising a channel extending through the porous plate.

12. The battery pack as claimed in claim 9, wherein the outer case includes at least one through-hole portion.

13. The battery pack as claimed in claim 12, wherein the at least one through-hole portion includes first and second through-hole portions, the first through-hole portion being an inlet for directing coolant for cooling the battery cells into the heat conducting member, and the second through-hole portion being an outlet for discharging the coolant from the heat conducting member.

14. The battery pack as claimed in claim 1, further comprising a housing encasing the at least one battery module, wherein the plurality of battery cells in the at least one battery module are aligned sided-by-side such that each side wall of each of the plurality of battery cells faces a side wall of an adjacent one of the plurality of battery cells.

15. The battery pack as claimed in claim 14, wherein the plurality of battery cells are aligned such that a positive electrode terminal of each of the plurality of battery cells is horizontally aligned with a negative electrode terminal of an adjacent one of the plurality of battery cells.

16. The battery pack as claimed in claim 1, wherein the at least one battery module further includes first and second end plates, the plurality of battery cells extending between first and second end plates of the battery module.

17. The battery pack as claimed in claim 16, wherein the at least one battery module includes at least one connection member, the first and second end plates being connected by the at least one connection member.

* * * * *